United States Patent [19]

Takei et al.

[11] Patent Number: 4,646,139
[45] Date of Patent: Feb. 24, 1987

[54] COLOR IMAGE PICKUP APPARATUS WITH COLOR FILTER ARRAY COMPRISING FILTER ELEMENTS OF THREE DIFFERENT COLORS ARRANGED TO PROVIDE REDUCED FOLDING DISTORTION

[75] Inventors: Masahiro Takei, Yokohama; Susumu Kozuki, Tokyo, both of Japan

[73] Assignee: Canon Kabushiki Kaisha, Tokyo, Japan

[21] Appl. No.: 606,536

[22] Filed: May 3, 1984

[30] Foreign Application Priority Data

May 9, 1983 [JP] Japan .................................. 58-81103

[51] Int. Cl.⁴ ........................ H04N 9/077; H04N 9/07
[52] U.S. Cl. ......................................... 358/44; 358/43
[58] Field of Search ........................ 358/41, 43, 44, 48

[56] References Cited

U.S. PATENT DOCUMENTS

| 4,016,598 | 4/1977 | Yamanaka | 358/41 |
| 4,064,532 | 12/1977 | Yamanaka | 358/44 |
| 4,437,112 | 3/1984 | Tanaka et al. | 358/44 |

FOREIGN PATENT DOCUMENTS 62285 4/1984 Japan ..................................... 358/44

Primary Examiner—James J. Groody
Assistant Examiner—Randall S. Svihla
Attorney, Agent, or Firm—Fitzpatrick, Cella, Harper & Scinto

[57] ABSTRACT

A color filter, that may be used in conjunction with an image pickup device, includes first, second and third filter domains each of which is transmissive to a different one of three kinds of light each having a different color spectral characteristic. The filter domains are arranged in a matrix consisting of rows and columns. In a predetermined row, the filter domains are arranged repeatedly in an order comprising the first, the second, the third, and a repeat of the third domains. In rows of the matrix adjacent the predetermined row, the filter domains are repeatedly arranged in an order comprising the third, a repeat of the third, the first, and the second domains. This filter has particular utility for use in conjunction with an image pick device having pixels each of which is arranged respectively corresponding to one of the first, the second, and the third filter domains with each pixel accumulating image information. In a preferred embodiment of the filter, the first, second and third filter domains transmit white, yellow and cyan light; green, yellow and cyan light; yellow, white and green light; or white, cyan and green light. Certain of the filter domains may be formed by certain combinations of red, green and blue filter segments. Use of the filter provides reduced folding distortion.

15 Claims, 19 Drawing Figures

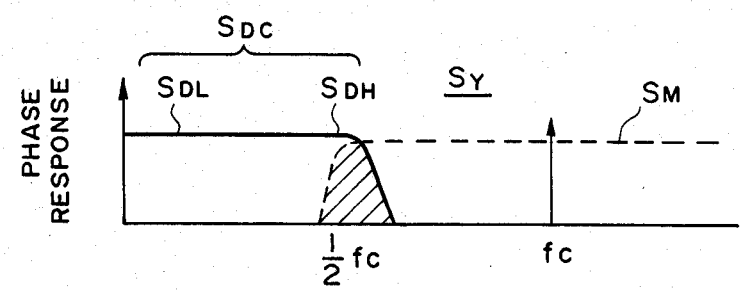
F I G. 1
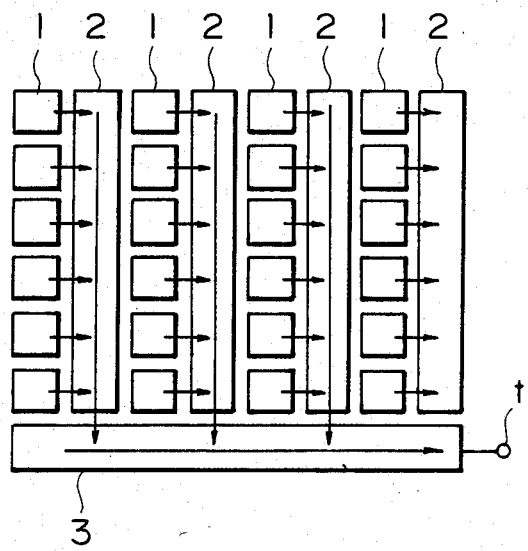
F I G. 2

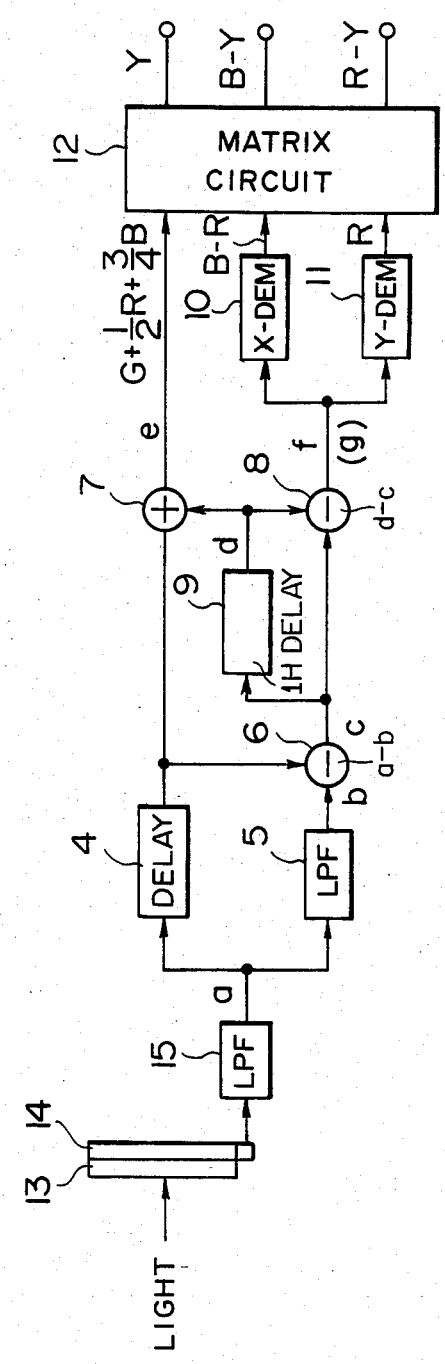
F I G. 5

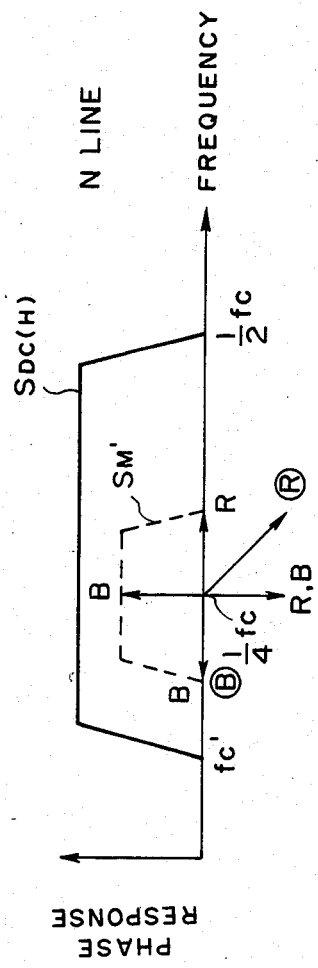
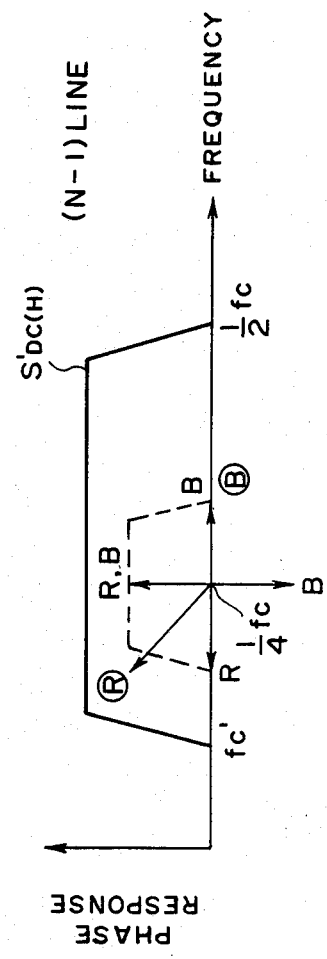
FIG. 6C
FIG. 6D

| FILTER DOMAIN / WORKING EXAMPLES | 100 | 101 | 102 |
|---|---|---|---|
| 2 | Yl | W | Cy |
| 3 | Yl | Cy | W |
| 4 | Cy | Yl | W |
| 5 | W | Cy | Yl |
| 6 | Cy | W | Yl |
| 7 | G | Yl | Cy |
| 8 | Yl | G | Cy |
| 9 | Yl | Cy | G |
| 10 | Cy | Yl | G |
| 11 | G | Cy | Yl |
| 12 | Cy | G | Yl |
| 13 | Yl | W | G |
| 14 | W | Cy | G |

FIG. 7

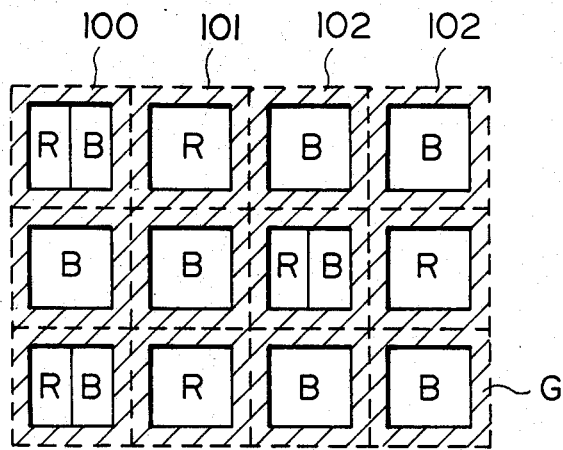
F I G. 8
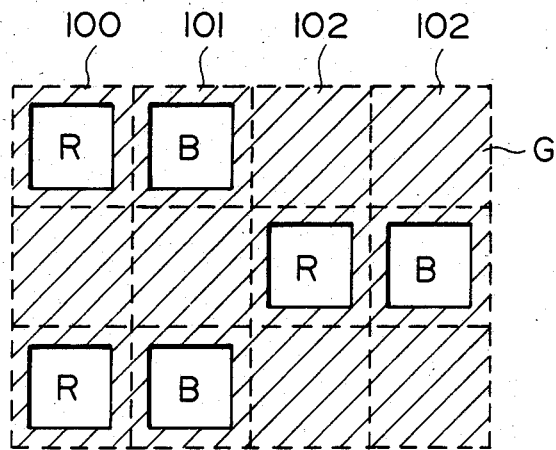
F I G. 9

| G | Yℓ | Cy | Cy | G | Yℓ | Cy | Cy |
|---|----|----|----|---|----|----|----|
| Cy | Cy | G | Yℓ | Cy | Cy | G | Yℓ |
| G | Yℓ | Cy | Cy | G | Yℓ | Cy | Cy |
| Cy | Cy | G | Yℓ | Cy | Cy | G | Yℓ |

FIG. 10

| Yℓ | W | G | G | Yℓ | W | G | G |
|----|---|---|---|----|---|---|---|
| G | G | Yℓ | W | G | G | Yℓ | W |
| Yℓ | W | G | G | Yℓ | W | G | G |
| G | G | Yℓ | W | G | G | Yℓ | W |

FIG. 11

| W | Cy | G | G | W | Cy | G | G |
|---|----|---|---|---|----|---|---|
| G | G | W | Cy | G | G | W | Cy |
| W | Cy | G | G | W | Cy | G | G |
| G | G | W | Cy | G | G | W | Cy |

FIG. 12

COLOR IMAGE PICKUP APPARATUS WITH COLOR FILTER ARRAY COMPRISING FILTER ELEMENTS OF THREE DIFFERENT COLORS ARRANGED TO PROVIDE REDUCED FOLDING DISTORTION

BACKGROUND OF THE INVENTION

1. Field of the Invention

The present invention relates to a novel improved color filter which is suitable for an image pickup apparatus using a solid state device such as a charge coupled device (CCD) or the like.

2. Description of the Prior Art

In case of using a solid state image pickup device such as a CCD or the like as an image pickup apparatus, the input video information is spatially sampled on the basis of a unit pixel of the image pickup device. Now, considering that a modulation signal ($S_{DC}$) is modulated by a sampling frequency ($f_c$), the reproducible modulation signal band becomes $(\frac{1}{2})f_c$ as will be understood from the sampling theorem. Therefore, if the sampling frequency is insufficient for the modulation signal band, the side band component of the sampling frequency $f_c$ will be overlapped in the high frequency component $S_{DH}$ of the modulation component $S_{DC}$ as shown in FIG. 1. The hatched portion will become the fold-distortion, so that it is undesirable because a flickering phenomenon is caused in the reproduction picture image due to this.

As a method of removing this fold-distortion, for example, there is a method whereby a band width of the modulation component $S_{DC}$ is limited. However, this method is not so good since it causes the resolving power to deteriorate. In addition, although a method is considered whereby the sampling frequency is raised by increasing the number of pixels, this causes a problem such that the manufacturing yield decreases.

SUMMARY OF THE INVENTION

It is an object of the present invention to provide an improved color filter which can solve such problem.

Another object of the invention is to provide an image pickup apparatus which does not always need an optical low pass filter for each of the colors to which the apparatus is responsive.

Still another object of the invention is to provide an image pickup apparatus with less fold-distortion.

It is also a further object of the invention to provide a color filter which is suitable to obtain such an image pickup apparatus as mentioned above.

Other objects and features of the present invention will become apparent from the following detailed description with reference to the accompanying drawings.

BRIEF DESCRIPTION OF THE DRAWINGS

FIG. 1 is a spectral diagram to describe a fold-distortion;

FIG. 2 is a diagrammatical view of an interline-type CCD;

FIG. 5 is a signal processing block diagram of the image pickup apparatus according to the invention;

FIGS. 6A to 6G are frequency spectral diagrams in each section thereof;

FIG. 7 is a diagram showing 2nd to 14th embodiments of the present invention;

FIG. 8 is a diagram of another embodiment of filter domains of the invention;

FIG. 9 is a diagram of the embodiment of the filter domains in the 9th embodiment; and FIGS. 10-12 are diagrammatical views of the construction of 7th, 13th and 14th embodiments of a color filter of the present invention.

DETAILED DESCRIPTION OF THE PREFERRED EMBODIMENTS

Figure 3:
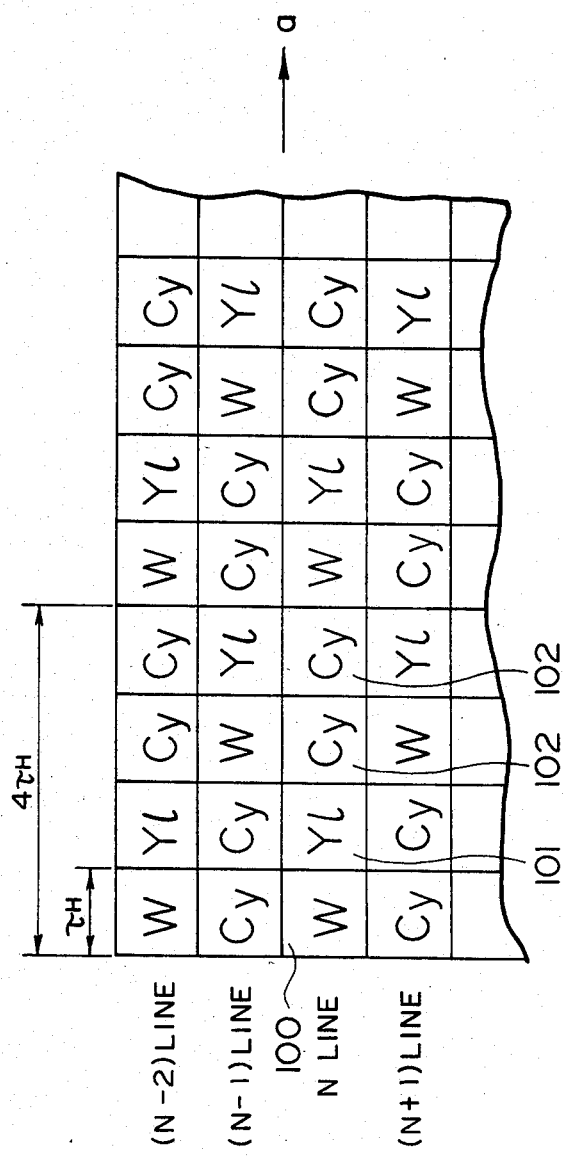
FIG. 3 is a diagrammatical view of the construction of a first embodiment of a color filter of the present invention.

The present invention will be described in detail hereinbelow with respect to the preferred embodiments thereof. FIG. 2 shows the fundamental construction of an interline transfer type CCD which is suitable when a color filter of the present invention is employed. A reference numeral 1 denotes photo-sensing elements as pixels, which are two-dimensionally arranged on a photo-sensing surface. A numeral 2 indicates vertical transfer registers and 3 is a horizontal transfer register.

An image pickup light is emitted onto the photo-sensing surface for a certain predetermined time and the signal charges corresponding to its video information are accumulated in the photo-sensing elements 1. Thereafter all of the charges are transferred onto the vertical transfer registers 2 by way of transfer pulses. Then, the charges in these vertical registers are transferred to the horizontal transfer register 3 one horizontal line at a time during a 1H (horizontal interval) period. The charges in the horizontal tranfer register are sequentially read out by a horizontal transfer clock signal.

In this way, the signal charges in all of the photo-sensing elements are read out at the standard television scanning speed.

FIG. 3 shows diagrammatically the construction of a first embodiment of a color filter of the present invention which should be combined with regard to the image pickup device as shown in FIG. 2.

As illustrated, this embodiment comprises first, second and third domains 100, 101 and 102 adapted to respectively transmit W (white), Yl (yellow), Cy (cyan), which are the colored light having three different kinds of spectral characteristics. These filter domains are arranged like a matrix which consists of rows and columns. In addition, in a predetermined row (for example, the N line), the filter domains are repeatedly arranged in the order of 100, 101, 102, and 102. On the other hand, in the rows (e.g., (N−1) and (N+1) lines) which are adjacent the predetermined row, the filter domains are repeatedly arranged in the order of 102, 102, 100 and 101.

In this way, in the color filter of the present embodiment, a unit of one period is formed by four filter domains in the horizontal scanning direction a.

In addition, each of the filter domains 100, 101 and 102 is arranged so that it corresponds to one of the photo-sensing elements 1 of the image pickup device as shown in FIG. 2, respectively.

Figure 4A:
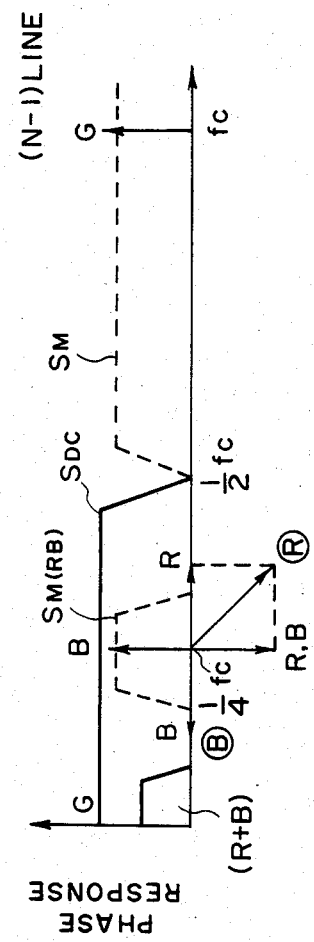
FIGS. 4A and 4B are frequency spectral diagrams of an output of an image pickup device using the present embodiment.
Figure 4B:
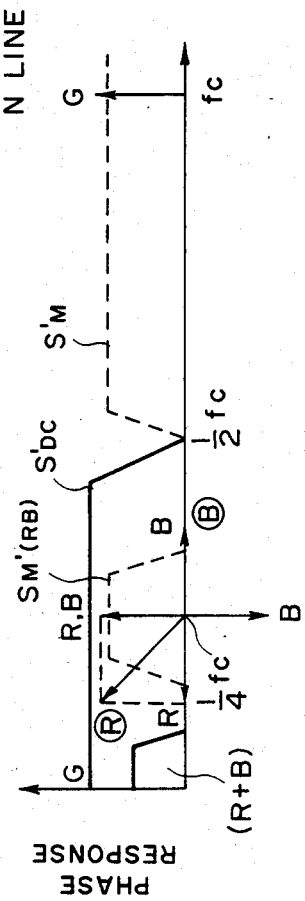

FIGS. 4A and 4B show the frequency spectral relations of the image pickup output from the image pickup device to which such a color filter was adhered and the phase relations of the color components. FIGS. 4A and 4B show spectral states of the (N−1) line and N line, respectively.

A further description will be supplemented regarding the signal band. Since the green signal largely relates to the luminance signal, a relatively wide band of about 3.0 to 5.0 MHz is needed as this signal band. On the other hand, a band of 500 kHz will be enough with respect to the image pickup signals of red and blue.

The frequency spectrum of the (N−1) line will be first discussed. As shown in FIG. 4A, the green signal band is set into a range of up to one half of the sampling frequency $f_c$ $(=1/\tau_H)$, thereby preliminarily keeping away from the influence of the fold-distortion due to the side band $S_M$ of the green signal modulation carrier. However, in this case, it should be noted that the green signal band has to be set to a band width so as not to cause the resolving power to deteriorate.

On one hand, the signal bands of R and B are preliminarily limited to the necessary bands as mentioned already by appropriately providing an optical LPF or the like on the optical path.

Since the G signal is sampled on a pixel unit basis, the side band $S_M$ occurs around the carrier frequency at the sampling frequency of $f_c(=1/\tau_H)$. When considering the ⓡ and ⓑ components, the following components are generated as the side bands around the sampling frequency of $(\frac{1}{2})f_c$ from the respective filter domains: i.e., the B component of the phase of 0° from the first Cy domain; the B component of the phase advance of 90° from the second Cy domain; the R and B components of the phase advance of 180° from the W domain; and the R component of the phase advance of 270° from the Yl domain. When the R components and the B components are now synthesized as vectors, respectively, it will be appreciated that they are represented by R and B in FIG. 4A.

Then, the N line will be discussed with reference to FIG. 4B. Although it can be seen that the G component is the same as the (N−1) line, with regard to the R and B components, the following components are obtained as the side bands: i.e., the R and B components of the phase of 0° from the W domain; the R component of the phase advance of 90° from the Yl domain; the B component of the phase advance of 180° from the first Cy domain; and the B component of the phase advance of 270° from the second Cy domain. The synthesized components of R and B are as indicated by ⓡ and ⓑ, respectively.

Namely, it will be appreciated that the phases of the side bands of R and B respectively relating to the N and (N−1) lines are substantially opposite to each other. Therefore, it is possible to offset or cancel the side bands, which otherwise would cause the fold-distortion, by adding together the image pickup outputs from the adjacent two horizontal intervals or lines.

The constitution and operation of a solid state image pickup apparatus using the color filter shown in FIG. 3 will now be described with reference to FIGS. 5 and 6A to 6G. FIGS. 6A to 6G respectively illustrate signals a to g at the noted locations in FIG. 5.

Figure 6A:
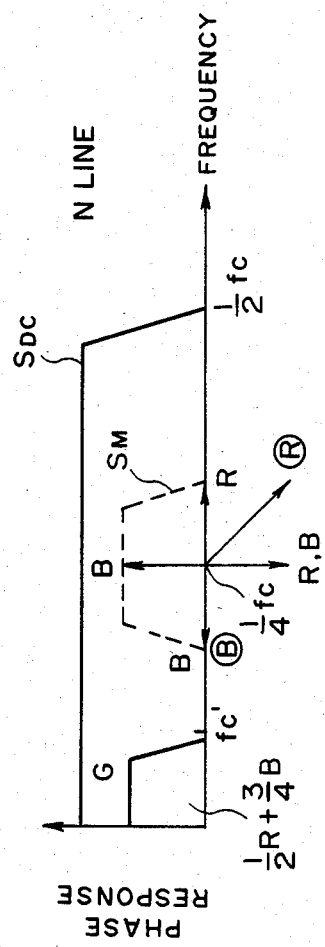
Figure 6B:
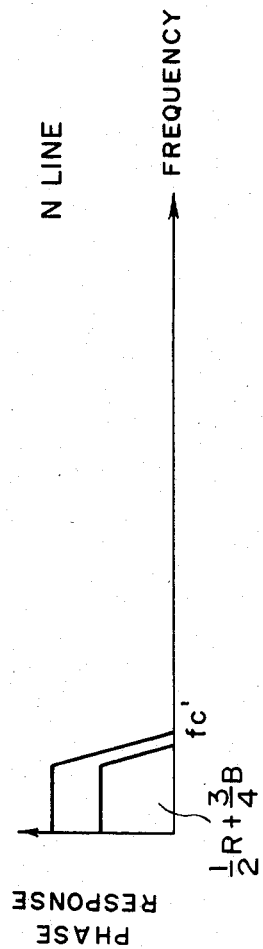
Figure 6E:
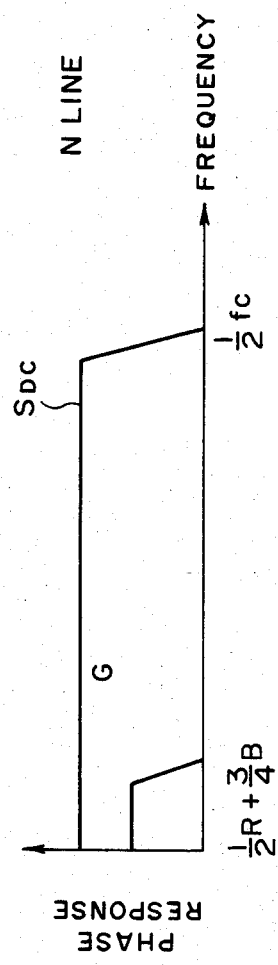
Figure 6F:
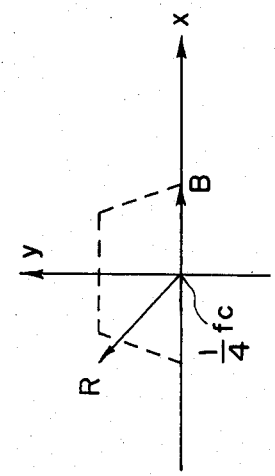
Figure 6G:
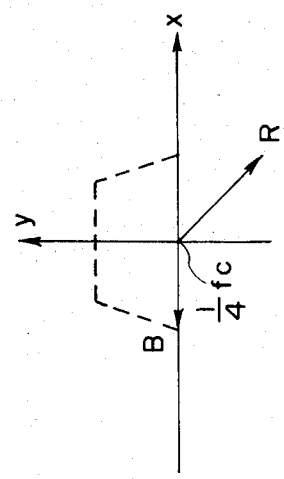

A reference numeral 14 denotes an image pickup device such as, e.g., interline type CCD or the like as image pickup means, and a filter 13 shown in FIG. 3 is attached to the front surface of this device. The side band around the carrier frequency $f_c$ is preliminarily removed from an output of this image pickup device by a low pass filter (LPF) 15 having a cut-off frequency of $(\frac{1}{2})f_c$ (FIG. 6A). This output, signal a, is respectively input to a delay circuit 4 and an LPF 5. The LPF 5 has a frequency response whereby a slightly higher frequency $f_c'$ than the modulation signal bands of red and blue shown in FIG. 6A is removed. A signal b which passes from the LPF 5 is subtracted from an original signal a by a subtracter 6, so that a signal c (FIG. 6C) of, from which the low band was removed, is obtained. The delay circuit 4 serves to correct the phase lag due to the LPF 5. In addition, the circuits 4,5,6,7,8 and 9 constitute arithmetic operating means of the present invention. This signal c is subtracted in a subtracter 8 from a signal d before 1H obtained from a 1H delay circuit 9 serving as delay means. Thus, the modulation signal $S_{DC}(H)$ is cancelled and only the side band $S_M$ due to the modulation carrier is finally obtained. This signal is demodulated by an x-axis demodulator 10 and a y-axis demodulator 11, respectively with regard to x and y axes, with the demodulators 10 and 11 serving as color separation processing means. Due to this, the (B−R) signal is separated and obtained from the former demodulator 10, while the R signal is obtained from the latter demodulator 11, respectively.

Thereafter, these two demodulation signals are input to a matrix circuit 12.

On the other hand, the original signal a from the delay circuit 4 is added to the modulation signal d, which was delayed by 1H and from which the low band was removed, by an adder 7. However, in this case, the side bands $S_M$ and $S_M'$ are cancelled since they have the opposite phases between the adjacent lines, so that a modulation signal e from which the fold-distortion was removed is derived finally. This modulation signal e together with the chroma signal component is input to the matrix circuit 12. Consequently a luminance signal Y and color difference signals (R−Y) and (B−Y) are produced.

As described above, the use of the color filter of the invention in the image pickup apparatus having such a constitution shown in FIG. 5 enables the fold-distortion due to a false signal to be easily removed.

Referring now to FIG. 7, there are shown second to fourteenth working examples of the arrangement of the domains 100, 101, and 102, of the color filter shown in FIG. 3. That is, filters in accordance with the second to fourteenth embodiments are obtained by substituting arrangements of domains 100, 101, and 102 as shown respectively in rows 2 to 14 in FIG. 7 for the corresponding domains 100, 101, and 102 in FIG. 3.

In these embodiments, although the color filter adapted to transmit at least the green component is arranged for the respective filter domains 100, 101 and 102, this is because the sampling frequency of the luminance signal is raised.

FIG. 8 shows another example of the arrangement of the filter domains. In this embodiment, W, Yl and Cy are made correspond to the filter domains 100 to 102, respectively, and the boundary portions among the respective domains are G and the respective complementary colors of W, Yl and Cy are arranged by combining the respective pure color filters for (R, B), R and B.

With such a an arrangement, the spectral characteristics of the complementary colors can be relatively accurately formed.

In addition, it is possible to eliminate the influence of a registration error when the color filter is adhered to the image pickup device.

FIG. 9 shows another example of an arrangement of the filter domains of the ninth embodiment shown in FIG. 7. In this example as well, the green transmission filter is used for the boundary region in a fashion similar to the example shown in FIG. 8.

Also, in addition to the examples shown in FIG. 7, the color filter of the invention may be a combination of Yl, W and G (one possible combination shown as working example 13 in FIG. 7) or a combination of W, Cy and G (one possible combination shown as working example 14 in FIG. 7), and the invention incorporates all of these.

In addition, in the embodiments shown in FIGS. 8 and 9, the boundary portions among the respectively filter domains 100-102 are as indicated by the broken lines in the diagrams.

That is, the filter domains of the color filter of the invention are defined by each pixel pitch of the image pickup device to which the color filter should correspond. FIGS. 10, 11 and 12 show diagrammatically the construction of 7th, 13th and 14th embodiments, respectively, of a color filter of the present invention, corresponding to the 7th, 13th and 14th working examples, respectively, shown in FIG. 7.

It is obvious that the color filter of the invention can be also applied to, for example, an MOS type X-Y address image sensor and the like.

As described above, according to the present invention, since a novel color filter arrangement is adopted, there is an effect such that the fold-distortion can be removed without necessarily using an optical LPF or increasing the number of pixels. Due to this, the flickering phenomenon on the screen can be completely eliminated. Therefore, the modulation signal band can be more widely enhanced than with conventional apparatus and an improvement in resolving power can be attained.

We claim:

1. A color filter comprising a plurality of first, second and third filter domains, wherein said first, second and third filter domains each transmit a respective one of three kinds of light each having a different color spectral characteristic, said filter domains being arranged in a matrix consisting of rows and columns, and wherein said filter domains are repeatedly arranged in an order of a first, a second, a third, and a third domain in a predetermined row, while said filter domains are repeatedly arranged in an order of a third, a third, a first, and a second domain in rows which are adjacent said predetermined row.

2. A color filter according to claim 1, wherein said first, second and third filter domains each transmit light having color spectral characteristics corresponding to a different one of white, yellow and cyan.

3. A color filter according to claim 1, wherein said first, second and third filter domains each transmit light having color spectral characteristics corresponding to a different one of green, yellow and cyan.

4. A color filter according to claim 1, wherein said first, second and third filter domains each transmit light having color spectral characteristics corresponding to a different one of yellow, white and green.

5. A color filter according to claim 1, wherein said first, second and third filter domains each transmit light having color spectral characteristics corresponding to a different one of white, cyan and green.

6. A color filter according to claim 1, wherein each of said first, second and third filter domains comprises at least one of red, blue and green filter segments.

7. A color filter according to claim 6, wherein said at least one of red, blue and green filter segments forms at least a portion of a boundary region between adjacent filter domains.

8. An image pickup apparatus comprising:
(a) a color filter comprising a plurality of first, second and third domains, wherein said first, second and third filter domains each transmit a respective one of three kinds of light each having a different color spectral characteristic, said filter domains being arranged in a matrix consisting of rows and columns, and wherein said filter domains are repeatedly arranged in an order of a first, a second, a third, and a third domain in a predetermined row, while said filter domains are repeatedly arranged in an order of a third, a third, a first, and a second domain in rows which are adjacent said predetermined row;
(b) image pickup means having pixels each of which is arranged respectively corresponding to one of said plurality of first, second and third filter domains, each of said pixels accumulating information;
(c) arithmetic operating means for performing an arithmetic operation on information accumulated by pixels corresponding to said filter domains of said predetermined row of said color filter and on information accumulated by pixels corresponding to said filter domains of at least one of said rows which are adjacent said predetermined row of said color filter, and for producing an output representing a result of the arithmetic operation; and
(d) color separation processing means for separating predetermined chroma signals from the output of said arithmetic operating means.

9. An image pickup apparatus according to claim 8, wherein said first, second and third filter domains each transmit light having color spectral characteristics corresponding to a different one of white, yellow and cyan.

10. An image pickup apparatus according to claim 8, wherein said first, second and third filter domains each transmit light having color spectral characteristics corresponding to a different one of green, yellow and cyan.

11. An image pickup apparatus according to claim 8, where said first, second and third filter domains each transmit light having color spectral characteristics corresponding to a different one of yellow, white and green.

12. An image pickup apparatus according to claim 8, wherein said first, second and third filter domains each transmit light having color spectral characteristics corresponding to a different one of white, cyan and green.

13. An image pickup apparatus according to claim 8, wherein each of said first, second and third filter domains comprises at least one of red, blue and green filter segments.

14. An image pickup apparatus according to claim 13, wherein said at least one of red, blue and green filter segments forms at least a portion of a boundary region between adjacent filter domains.

15. An image pickup apparatus according to claim 8, wherein said arithmetic operating means includes delay means for delaying information accumulated by said pixels of said image pickup means by an interval corresponding to one row of filter domains of said color filter.

* * * * *